United States Patent [19]

Ono et al.

[11] 4,254,028

[45] Mar. 3, 1981

[54] STYRENE RESIN COMPOSITION

[75] Inventors: Shohachi Ono, Kurashiki; Noriaki Umeda, Yokosuka; Hisayoshi Kai, Chiba; Kenichi Okada, Yokohama, all of Japan

[73] Assignee: Asahi-Dow Limited, Tokyo, Japan

[21] Appl. No.: 74,022

[22] Filed: Sep. 10, 1979

[51] Int. Cl.³ .................. C08K 5/09; C08L 25/04
[52] U.S. Cl. .................. 260/23 S; 264/300
[58] Field of Search ............ 264/300, DIG. 10; 260/23 S, 998.16

[56] References Cited

U.S. PATENT DOCUMENTS

| | | | |
|---|---|---|---|
| 2,675,362 | 4/1954 | Shusman | 260/23 S |
| 2,779,744 | 1/1957 | Groff et al. | 260/23 S |
| 3,355,404 | 11/1967 | Ruffing et al. | 260/23 S |
| 3,666,699 | 5/1972 | Nixon et al. | 260/23 S |
| 4,033,912 | 7/1977 | Kleimann et al. | 264/300 |
| 4,088,617 | 5/1978 | Skalla et al. | 260/23 S |

*Primary Examiner*—Ronald W. Griffin
*Attorney, Agent, or Firm*—R. B. Ingraham

[57] ABSTRACT

Improved mold release is obtained in a styrene polymer by incorporating a mixture of fatty acid and metal fatty acid salt.

2 Claims, 4 Drawing Figures

STYRENE RESIN COMPOSITION

The present invention relates to an improved styrene resin composition and, more particularly, to such a styrene resin composition which shows a high releasability that is required when the resin being molded is released from the mold at elevated temperatures and which is effective to improve the strength of weldlines that are usually formed in injection moldings and injection blow moldings of styrene resins.

As additives for improving the releasability and flowability of a styrene resin under being processed and molded, higher fatty acids, higher fatty amides, metal salts of higher fatty acids, lower alcohol esters of higher fatty acids, polyvalent alcohol esters of fatty acids, liquid paraffins or waxes are ordinarily used selectively depending upon the types of resin and other additives, molding conditions and specific applications of the resultant moldings.

For molding a hollow container of styrene resin, one of practically applicable processes is a so-called injection blow molding in which a raw resin is first injection-molded into a closed-end cylindrical piece (generally called a closed-end parison) and the resultant uncured parison is then transferred together with a core (male mold for injection molding) into a blow mold, where compressed air is blown into the piece through the core to mold the same into a hollow container. In an ordinary injection molding, moldings are released from their molds at about 60° C. or below. While, in an injection blow molding process, parisons are released from their cores, namely, blow-molded at higher temperatures ranging from 95° C. to 160° C., as far as commerical scale production is concerned. Generally, an allowable temperature range for releasing becomes narrower as the releasing temperature becomes higher, although it varies more or less with the type and formulation of the resin used. Especially, in an injection blow molding, it is difficult to release closed-end parisons from their cores upon blow molding and the resulting blow moldings cannot have a sufficient reproducibility, if the temperature of the plasticized resin and core is too low. While, if the temperature of the parison and core is excessively high, the resulting blow moldings will undergo an undesirable thickness variation or have nonuniform thicknesses and, in extreme cases, may be wrinkled. Under these cirstances, for solving such technical problems to permit a production of blow moldings in a stabilized manner with a high reproducibility, molding conditions are strictly controlled and resin formulations are carefully selected. However, excessive control over molding conditions is disadvantageous for commercial scale production of blow moldings. Further, a use of an excessive amount of releasing agent as a resin additive is not only disadvantageous economically, but also causes undesirable problems owing to formation of oxides within a molding machine and sticking or retention of the releasing agent onto or in the molding machine including the mold because of a continuous application of heat thereto in the molding process.

Besides these, one of phenomena, incidental to molding of styrene resin compositions, that are problematical in respect of the strength of resultant moldings is the formation of weldlines. Weldlines can be regarded as scars formed at positions where branched flows of molten resin flowing through separate channels in the mold join again to be fused together and they can be found in most injection moldings and injection blow moldings. To elucidate in greater detail, weldlines are mainly caused by: (1) an insufficient flowability of resin, lower injection speed and nozzle temperature owing to a low resin temperature, in terms of the molding conditions; (2) an excessive distance from gates to welding areas, lower mold temperature, inadequate position and number of gates, too small gates and runner and incomplete gas removal, in terms of the mold used; and (3) excessive moisture and volatile contents, poor flowability and too fast curing of the resin used, use of an excessive quantity of releasing agent and use of an unsuitable or excessive quantity of lubricant, in terms of the resin composition.

The weldline constitutes one of the weak points of injection moldings and injection blow moldings in respect of physical or mechanical properties and, in general, the weldline portions have poorer mechanical properties that those of other portions, as exemplified by 2 to 10% reduction in tensile strength, 70 to 80% reduction in tensile impact strength, 5 to 20% reduction in bending strength and breaking bending deflection, with reduction in creep rupture strength down to 1/10 to 1/1000 of that of the latter. Thus, improvements in the aforementioned factors, namely, molding conditions, mold designing and resin compositions are highly desired in the industry.

As far as injection blow moldings are concerned, their greatest weak points in mechanical strength exist in their weldlines at their top or neck ends. Therefore, necks or neck ends of such injection blow moldings, especially, thin-walled ones molded by injection blow molding machines existingly used in the industry, are often broken at their weldlines by a compressive force orthogonally exerted thereto when they are subjected to printing, pneumatically transported, stored or when they are filled up with contents. Also from this aspect, an improvement in resin compositions is strongly desired.

The inventors have conducted a series of intensive studies to overcome the aforementioned drawbacks of the prior art injection moldings or injection blow moldings of styrene resin composition and successfully discovered an improved styrene resin composition which has an especially high releasability at elevated temperatures and which can remarkably improve the weldline strength without adversely affecting the physical properties and moldability of any other portions than weldlines at all. The present invention has been achieved on the basis of the thus discovered styene resin composition.

This is to say, the present invention provides an improved styrene resin composition having an excellent releasability at elevated temperatures characterized by comprising a styrene resin and additives consisting of at least one of saturated linear carboxylic acids having 12 to 22 carbon atoms (A) and at least one of metal salts of higher fatty acids (B), said additives totaling to 0.07 to 0.4 part by weight based on said styrene resin and the weight ratio of said component (B) to said component (A) ranging from ⅓ to 3.5.

In another aspect of the present invention, injection moldings and injection blow moldings having a remarkably improved weldline strength and excellent releasability, thermal stability as well as good physical properties can be obtained by limiting, in the aforementioned styrene resin composition, the weight ratio of said component (B) to said component (A) to a value in the range of ½ to 2.0.

The styrene resins herein referred to include homopolymers of styrene, copolymers of styrene and styrene derivatives (for example, α-substituted styrene such as α-methylstyrene, nucleus-substituted styrene such as o-chlorostyrene) copolymerizable with styrene, copolymers of styrene and acrylonitrile, α-methyl acrylonitrile or the like substances copolymerizable with styrene, copolymers of styrene and mixtures of these latter resins and synthetic rubbers, and interpolymer (impact-resistant polystyrene) obtained by polymerizing styrene with monomers copolymerizable therewith in the presence of synthetic rubbers.

According to the present invention, at least one of saturated linear monocarboxylic acids having 12 to 22 carbon atoms such as palmitic acid, stearic acid and behenic acid is used as a first additive group. These additives may be used singly or as a mixture of two or more of them.

Further, according to the present invention, at least one of metal salts of higher fatty acids is used as a second additive group and, more specifically, it is preferable to use salts of the aforementioned monocarboxylic acids and metals such as barium, calcium, zinc, magnesium and aluminium. Particularly preferably are salts of calcium, zinc and magnesium. Thus, typical examples of the aforesaid second group additives are barium stearate, calcium stearate, calcium behenate, calcium laurate, zinc stearate, zinc laurate, aluminum stearate and magnesium stearate. These may be used singly or as a mixture of two or more of them.

According to the present invention, 0.07 to 0.4 part by weight of additives consisting of at least one of the aforementioned higher fatty acids and at least one of the aforementioned metal salts of higher fatty acids in a quantity of ⅓ to 3.5 times the quantity of said higher fatty acids are mixed with 100 parts by weight of a styrene resin. These additives are used for improving the releasability of the resulting resin composition at elevated temperatures. If the additives content is smaller than 0.07 part by weight per 100 parts by weight of the styrene resin, the resultant styrene resin composition cannot have a sufficient releasability. While, an additives content exceeding 0.4 part by weight does produce a sufficient releasability, but such an excessive content is not only disadvantageous economically, but also causes various problems including formation of colored oxides within the molding machine, deposition, onto the mold, of heavily viscous substances supposedly resulting from such additives, and formation of smelly moldings. In the meantime, if the content of the aforementioned metal salts of higher fatty acids is less than ⅓ of the saturated linear carboxylic acid content, the resultant resin composition cannot have a remarkably improved releasability at elevated temperatures as compared with that achievable with mere a use of the saturated linear carboxylic acid alone. On the other hand, if the content of the metal salts of higher fatty acids is larger than 3.5 times the saturated linear carboxylic acid content, the resultant resin composition cannot have a remarkably improved releasability at elevated temperatures as compared with that achievable with mere a use of the aforementioned metal salts of higher fatty acids alone, as well.

The "elevated temperatures" herein referred to in connection with the releasability of a styrene resin composition denote temperatures of around Vicat softening point of a styrene resin used or higher temperatures, namely, 95° C. or higher temperatures, with upper limit of about 165° C. At such elevated temperatures, a styrene resin composition shows a remarkably different releasability from that it shows at such lower temperatures as prevalent in ordinary injection molding. The finding, on which the present invention is based, that a styrene resin composition containing a predetermined range of specific additives is highly valuable from a viewpoint of its industrial utilization.

As described previously, the present invention is characterized in that at least one of higher fatty acids is added to a styrene resin composition together with at least one of metal salts of higher fatty acids. If only the metal salts of higher fatty acids are added alone as releasing agents to the styrene resin composition to such an extent that an acceptable releasability is ensured during the molding process, the resultant moldings will have an insufficient weldline strength. While, if only the higher fatty acids are added alone as releasing agents to the styrene resin composition to such an extent that an acceptable releasability is secured during the molding process, an improved weldline strength may certainly be obtained, but many troubles will occur. For example, the resin may undergo discoloration as a result of decomposition of the higher fatty acids caused by a thermal history to which the resin composition is subjected during the molding process, or the moldings may be scorched or the higher fatty acids may adhere to mold surfaces because the higher fatty acids are decomposed while the resin composition is retained in the molding machine.

In accordance with the present invention, for solving the aforementioned problems, 0.07 to 0.4 part by weight of a mixture of at least one higher fatty acid and at least one metal salt of higher fatty acid is added to 100 parts by weight of a styrene resin in such a manner that the weight of said higher fatty acid to said metal salt of higher fatty acid ranges from 0.5 to 2.0.

If the weight ratio of said higher fatty acid to said metal salt of higher fatty acid is smaller than 0.5, the weldline strength will not be improved to any significant extent. While, if said weight ratio is larger than 2.0 in the presence of a sufficient content of said releasing agents mixture for maintaining an adequate releasability during the molding process, the resin may undergo discoloration or the resultant moldings may be scorched.

BRIEF DESCRIPTION OF THE DRAWINGS

FIGS. 1 through 3 schematically illustrate a method and equipment for measuring the "peeling strength" which is significantly correlated with releasability of resin compositions at elevated temperatures, wherein FIG. 1 is a longitudinal section showing a state in which a cover plate is being stripped from a resin plate specimen under being measured;

FIG. 2 is a cross section taken on the line C—C of FIG. 1; and

FIG. 3 is a partially enlarged sectional view of a part B (cover plate chuck) shown in FIG. 1.

Hereinafter, the present invention will be described further in detail by way of the preferred embodiments in connection with comparative and referential examples, in which all parts and percents are given in terms of weight. However, it is to be noted that these preferred embodiments are presented to give a better understanding of the present invention and should not be construed in any limiting sense to the present invention.

PREFERRED EMBODIMENT NO. 1

A blend was prepared from 65 parts by weight of a general purpose polystyrene (GPPS) and 35 parts by weight of a high impact polystyrene (HIPS). The blend had a Vicat softening point of 97.6° C., The GPPS had a weight average molecular weight of 23,500 and a molecular distribution (weight average molecular weight/number average molecular weight) of 2.70 and HIPS was Styron 470 manufactured by Asahi-Dow Limited. The additives shown in Table 1 were evenly mixed individually or in combination in the quantities as specified in the table with 100 parts by weight of the blend in all cases by the use of an extruder to obtain pelletized compositions. Each of the pelletized compositions thus obtained was individually injection molded into platelike, rectangular specimens 2.7 mm thick, 5.0 cm wide and 9.0 cm long.

Figure 1:
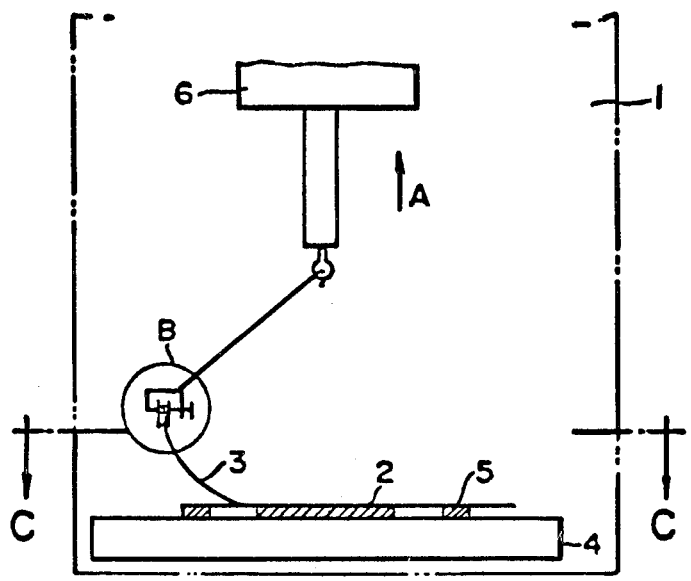
Figure 3:
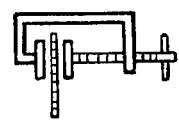
Figure 2:
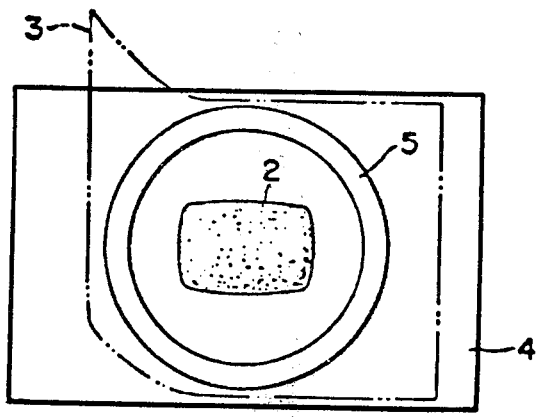
Figure 4:
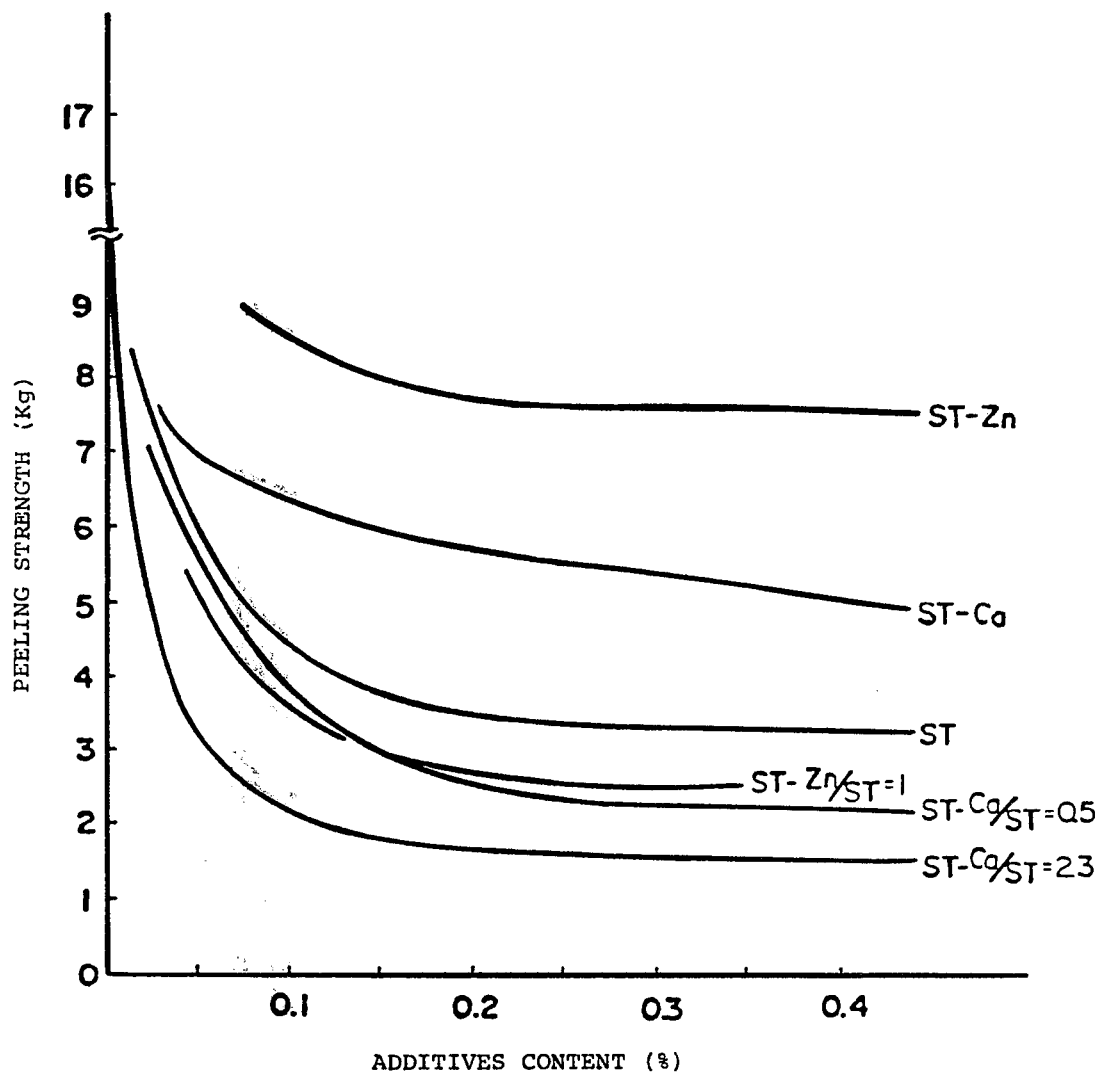
FIG. 4 is a chart in which the peeling strength is plotted against varied additive formulations sampled out of the preferred embodiment No. 1.

The releasability of the specimens was measured with a device shown in FIGS. 1 through 3. A sandwich mold 5, 1.0 mm in thickness and 20 cm in diameter was put between a copper plate 4, 0.5 mm thick having a very rough surface and a photographic ferrotype plate 3, 0.1 mm thick with a smooth surface. Each specimen was placed in the center of the sandwich mold and pre-heated at 200° C. for 60 seconds and then, compression molded under the pressure of 200 kg/cm² for 30 seconds. Thus molded specimen with the mold, copper plate and ferrotype plate was placed on a universal tensile tester 6 in a constant temperature chamber 1. The temperature of the specimen surface was maintained at 120° C.±0.5° C. The ferrotype plate was pulled off from the specimen in the direction of arrow mark A at a rate of 500 mm/second with a 50 kg load cell to measure peeling strength. The peeling strength value of each composition was worked out as average of five measurements. The values are shown in Table 1. In the table, specimen Nos. 28 through 46 are of comparison. FIG. 4 shows a chart plotting the relationship between peeling strength and the quantity and combination of the additives contained in some representative compositions in Preferred embodiment No. 1. In FIG. 4, ST denotes stearic acid, ST-Ca calcium stearate and ST-Zn zinc stearate.

It is understood from the test results shown in Table 1 and the chart plotted in FIG. 1 that the use of higher fatty acids and their metal salts in combination at given ratios lowers the strength of peeling the ferrotype plate from the resin plate at 120° C. much more greatly than the use of them individually.

TABLE 1

| Specimen No. | Additives | Contents (%) | Peeling strength (Kg) |
|---|---|---|---|
| 1 | Stearic acid | 0.10 | 2.6 |
|   | Zinc stearate | 0.10 |  |
| 2 | Stearic acid | 0.10 | 2.1 |
|   | Barium stearate | 0.15 |  |
| 3 | Stearic acid | 0.10 | 1.7 |
|   | Magnesium stearate | 0.10 |  |
| 4 | Stearic acid | 0.10 | 1.6 |
|   | Calcium stearate | 0.10 |  |
| 5 | Stearic acid | 0.10 | 1.9 |
|   | Aluminum stearate | 0.10 |  |
|   | Stearic acid | 0.03 |  |
| 6 | Calcium behenate | 0.10 | 1.8 |
|   | Behenic acid | 0.03 |  |
| 7 | Behenic acid | 0.10 | 2.1 |
|   | Calcium laurate | 0.15 |  |
| 8 | Behenic acid | 0.02 | 2.2 |
|   | Calcium stearate | 0.06 |  |
| 9 | Palmitic acid | 0.27 | 2.7 |
|   | Aluminium stearate | 0.10 |  |
| 10 | Behenic acid | 0.25 | 1.5 |
|   | Aluminium stearate | 0.10 |  |
| 11 | Stearate acid | 0.07 | 2.5 |
|   | Calcium stearate | 0.03 |  |
| 12 | Stearic acid | 0.07 | 1.9 |
|   | Calcium stearate | 0.20 |  |
| 13 | Stearic acid | 0.15 | 2.2 |
|   | Calcium stearate | 0.07 |  |
| 14 | Stearic acid | 0.17 | 1.8 |
|   | Calcium stearate | 0.17 |  |
| 15 | Stearic acid | 0.14 | 1.6 |
|   | Magnesium stearate | 0.06 |  |
| 16 | Stearic acid | 0.05 | 3.0 |
|   | Calcium stearate | 0.03 |  |
| 17 | Stearic acid | 0.25 | 1.8 |
|   | Calcium stearate | 0.13 |  |
| 18 | Stearic acid | 0.20 | 2.2 |
|   | Calcium stearate | 0.10 |  |
| 19 | Stearic acid | 0.05 | 2.6 |
|   | Aluminium stearate | 0.05 |  |
| 20 | Stearic acid | 0.05 | 3.5 |
|   | Zinc stearate | 0.05 |  |
| 21 | Stearic acid | 0.15 | 2.5 |
|   | Zinc stearate | 0.15 |  |
| 22 | Behenic acid | 0.15 | 2.2 |
|   | Calcium stearate | 0.07 |  |
| 23 | Behenic acid | 0.15 | 2.7 |
|   | Zinc stearate | 0.07 |  |
| 24 | Palmitic acid | 0.10 | 2.2 |
|   | Calcium stearate | 0.10 |  |
|   | Behenic acid | 0.07 |  |
| 25 | Calcium stearate | 0.10 | 2.0 |
|   | Magnesium stearate | 0.10 |  |
| 26 | Behenic acid | 0.07 | 1.9 |
|   | Aluminium stearate | 0.20 |  |
| 27 | Stearic acid | 0.10 | 1.5 |
|   | Aluminium stearate | 0.10 |  |
| 28 | Nothing | — | 16.1 |
| 29 | Stearic acid | 0.48 | 3.2 |
| 30 | Stearic acid | 0.35 | 2.2 |
|   | Calcium stearate | 0.25 |  |
| 31 | Behenic acid | 0.025 | 5.0 |
|   | Calcium stearate | 0.025 |  |
| 32 | Behenic acid | 0.20 | 3.4 |
| 33 | Stearic acid | 0.20 | 3.5 |
| 34 | Barium stearate | 0.28 | 5.8 |
| 35 | Calcium stearate | 0.30 | 5.4 |
| 36 | Zinc stearate | 0.30 | 7.5 |
| 37 | Zinc stearate | 0.18 | 7.8 |
| 38 | Zinc stearate | 0.10 | 8.5 |
| 39 | Calcium stearate | 0.42 | 5.0 |
| 40 | Calcium stearate | 0.18 | 5.8 |
| 41 | Calcium stearate | 0.05 | 6.9 |
| 42 | Stearic acid | 0.05 | 6.0 |
| 43 | Stearic acid | 0.10 | 4.4 |
| 44 | Behenic acid | 0.34 | 3.4 |
|   | Magnesium stearate | 0.05 |  |
| 45 | Stearic acid | 0.025 | 5.0 |
|   | Zinc stearate | 0.025 |  |
| 46 | Stearic acid | 0.02 | 5.5 |
|   | Calcium stearate | 0.04 |  |
| 47 | Stearic acid | 0.20 | 1.6 |
|   | Calcium stearate | 0.40 |  |
| 48 | Stearic acid | 0.10 | 1.6 |
|   | Calcium stearate | 0.20 |  |
| 49 | Stearic acid | 0.05 | 1.8 |
|   | Calcium stearate | 0.10 |  |

PREFERRED EMBODIMENT NO. 2

Styrene resin compositions of the same formulations as those used for specimen Nos. 10 through 14 and Nos. 28 through 31 of Preferred embodimemt No. 1 were respectively subjected to injection blow molding in a continuous operation over longer period (2 days to 3 weeks and over) to be molded into bottles weighing 3.60 g with a capacity of about 53 cc. The molding machine used was Model H-16A (with a plasticizing capacity of 15 Kg/hr. and clamping pressure of 75 tons, plunger type manufactured by MEIKI CO. LTD.). Its nozzle was maintained at 230° C., storage cylinder at 233°±2° C. and hot runner at 230° C.±2° C., respectively. The bottles were molded in a single-cavity mold at a cycle time of 6.5 seconds. The core temperature was adjusted by varying the temperature of core heating oil above and below an average temperature of 150° C. In the blow molding process, nitrogen gas under pressure of 5.0 Kg/cm² was blown into the mold. The releasability of resin compositions were evaluated on the basis of the molding stability observed when the core surface temperature was changed by varying the core heating oil temperature. That is to say, those resins which could withstand a core heating oil temperature variation of 11° C. or more to stably produce acceptable bottles were ranked as being excellent (A), and those which could withstand such a temperature variation of 8° C. or more but less than 11° C. to stably produce acceptable bottles were ranked as being good (B). While, those resins which could withstand a core heating oil temperature variation of 5° C. or more but less than 8° C. to stably produce acceptable bottles were ranked as being moderate (C), and those which could not withstand such a temperature variation of at least 5° C. were ranked as being unacceptable (D). At the same time, the continuous molding operation was visually checked for any problematical conditions occurring therein, the results of which were also used to evaluate the respective resin compositions. These test results are summarized in Table 2 to be given on the following page.

TABLE 2

| Specimen No. | Additives | Contents (%) | Releasability | Observations on molding conditions |
|---|---|---|---|---|
| 10 | Behenic acid<br>Aluminium stearate | 0.25<br>0.10 | A | A slight amount of oxides were deposited onto the molding machine surface after a long period (3 weeks) of continuous operation. No problem otherwise. |
| 11 | Stearic acid<br>Calcium stearate | 0.07<br>0.03 | B | In very rare cases (once in 2 weeks), resin was fused to core surface. No problem otherwise. |
| 12 | Stearic acid<br>Calcium stearate | 0.07<br>0.20 | A | No problem. |
| 13 | Stearic acid<br>Calcium stearate | 0.15<br>0.07 | A | No problem. |
| 14 | Stearic acid<br>Calcium stearate | 0.17<br>0.17 | A | No problem. |
| 28 | Nothing | — | D | Stable molding was not feasible at all. |
| 29 | Stearic acid | 0.48 | A | Over long period (3 weeks) of continuous operation, a large amount of oxides were deposited onto molding machine surface. Core had an oily substance deposition, which had to be wiped off. Resin was fused onto core surface fairly frequently. |
| 30 | Stearic acid<br>Calcium stearate | 0.35<br>0.25 | A | Over a long period (over 5 weeks) of continuous operation, a larege quantity of oxides were deposited onto molding machine surface. An oily substance was deposited onto core. Resin was fused onto core surface several times in 3 weeks. |
| 31 | Behenic acid<br>Calcium stearate | 0.025<br>0.025 | C | The molding process was far from being expressable as "stabilized". Resin was deposited onto core surface once or twice in 2 days. |

In view of the releasability and observations on moldability summarized in Table 2, the resin compositions of specimen Nos. 10 through 14 can be generally evaluated as having very excellent moldability for injection blow molding. While, the resin compositions of the specimen Nos. 28 through 31 cannot be evaluated as having a stable moldability.

This fact has a significant correlationship to the results of the peeling strength test in the preferred embodiment No. 1, in which the peeling strength required to strip a compression-molding cover plate from a resin plate at elevated temperatures was measured.

REFERENTIAL EXAMPLE NO. 1

As shown in Table 3, additives were mixed, individually or in combination in various quantities, with the resin blend of Preferred embodiment No. 1 to prepare various styrene resin compositions. The releasability of the resin compositions was measured at a typical releasing temperature of 50° C.±0.8° C. generally used in an ordinary injection molding technique. Each of the resin compositions was molded into a hexagonal cap nut with a metal bolt kept put therein by using a screw type injection molding machine. The molding machine had a clamping capacity of 45 tons and a plasticizing capacity of 15 Kg/hr. The conditions of the injection molding were resin temperature of 230° C., injection pressure of 30 kg/cm², injection time of 8 seconds and pressure retention time of 8 seconds respectively. The hexagonal cap nut made of the resin composition had sides, each of which was 1.524 cm, with putting therein a metal bolt 2.794 cm in diameter having 6 flights of which depth was 0.127 cm and of which pitch was 0.158 cm. Thus molded cap nut with the bolt was taken out of the mold. The releasability of the cap nut from the bolt was measured with a Model HD Torque Meter manufactured by Owens-Illinois Co. when the temperature of the nut reached ca. 50° C. The test results are shown in Table 1.

As may be understood from the results in the table, the use of the additives in combination hardly brought about a synergetic effect on the improvement in releasability at a temperature of as low as 50° C. or so.

TABLE 3

| Specimen No. | Additives | Contents (%) | Releasing torque (ft-lb) |
|---|---|---|---|
| 1 | Nothing | — | 100 or more |
| 2 | Stearic acid | 0.05 | 90 |
| 3 | Behenic acid | 0.075 | 75 |
| 4 | Stearic acid | 0.075 | 77 |
| 5 | Stearic acid | 0.20 | 70 |
| 6 | Stearic acid | 0.30 | 68 |
| 7 | Stearic acid | 0.48 | 66 |
| 8 | Stearic acid | 0.60 | 63 |
| 9 | Aluminium stearate | 0.20 | 49 |
| 10 | Zinc stearate | 0.20 | 45 |
| 11 | Magnesium stearate | 0.20 | 44 |
| 12 | Calcium stearate | 0.20 | 48 |
| 13 | Calcium stearate | 0.075 | 56 |
| 14 | Behenic acid | 0.075 | 48 |
|  | Calcium stearate | 0.15 |  |
| 15 | Stearic acid | 0.075 | 51 |
|  | Calcium stearate | 0.15 |  |
| 16 | Stearate acid | 0.15 | 49 |
|  | Calcium stearate | 0.30 |  |
| 17 | Behenic acid | 0.075 | 45 |
|  | Aluminium stearate | 0.15 |  |
| 18 | Behenic acid | 0.15 | 53 |
|  | Calcium stearate | 0.075 |  |
| 19 | Behenic acid | 0.25 | 50 |
|  | Aluminium stearate | 0.10 |  |
| 20 | Stearic acid | 0.14 | 52 |
|  | Magnesium stearate | 0.06 |  |

PREFERRED EMBODIMENT NO. 3

To 100 parts of HI polystyrene (Styron #492 produced by Asahi-Dow Limited) as a styrene resin according to the present invention, varied quantities of various additives as shown in Table 4 were added and the resultant respective resin compositions were injection-molded into flat resin plates. Then, these resin plates were compression-molded, and the peeling strength required to strip a compression-molding cover plate from the respective resin plates at elevated temperatures was measured in a similar manner to that used in the preferred embodiment No. 1, the results of which are also given in Table 4. In the experiments No. 9* through 11*, the peeling strength was measured at 109°±0.5° C. The specimen Nos. 1 through 3, 9* and 11* represent comparative examples.

TABLE 4

| Specimen No. | Additives | Contents (%) | Peeling strength (kg) |
|---|---|---|---|
| 1 | Nothing | — | 18.8 |
| 2 | Behenic acid | 0.30 | 2.0 |
| 3 | Stearic acid | 0.11 | 2.4 |
| 4 | Behenic acid | 0.15 | 1.8 |
|  | Stearic acid | 0.15 |  |
| 5 | Behenic acid | 0.04 | 1.3 |
|  | Calcium stearate | 0.04 |  |
| 6 | Stearic acid | 0.11 | 1.6 |

TABLE 4-continued

| Specimen No. | Additives | Contents (%) | Peeling strength (kg) |
|---|---|---|---|
|  | Aluminium stearate | 0.11 |  |
| 7 | Stearic acid | 0.06 | 1.2 |
|  | Calcium stearate | 0.20 |  |
| 8* | Behenic acid | 0.30 | 0.23 |
| 9* | Behenic acid | 0.15 | 0.18 |
|  | Calcium stearate | 0.15 |  |
| 10* | Behenic acid | 0.11 | 0.15 |
|  | Aluminium stearate | 0.11 |  |
| 11* | Nothing | — | 0.58 |

PREFERRED EMBODIMENT NO. 4

Except that a machine-polished iron sheet 0.08 mm thick was used instead of ferrotype plate for measuring the peeling strength, similar processes to those used in the preferred embodiment No. 1 were repeated, the results of which are summarized in Table 5. The specimen Nos. 1 through 5 represent comparative examples.

TABLE 5

| Specimen No. | Additives | Contents (%) | Peeling strength (kg) |
|---|---|---|---|
| 1 | Nothing | — | 28.9 |
| 2 | Stearic acid | 0.20 | 10.9 |
| 3 | Behenic acid | 0.20 | 13.3 |
| 4 | Calcium stearate | 0.30 | 10.6 |
| 5 | Zinc stearate | 0.30 | 13.4 |
| 6 | Behenic acid | 0.15 | 6.1 |
|  | Zinc stearate | 0.07 |  |
|  | Behenic acid | 0.03 |  |
| 7 | Calcium stearate | 0.10 | 5.6 |
|  | Stearic acid | 0.03 |  |
| 8 | Behenic acid | 0.25 | 5.8 |
|  | Aluminium stearate | 0.10 |  |
| 9 | Stearic acid | 0.05 | 7.5 |
|  | Zinc stearate | 0.05 |  |
| 10 | Stearic acid | 0.17 | 5.5 |
|  | Calcium stearate | 0.17 |  |

PREFERRED EMBODIMENT NO. 5

By using a styrene-acrylonitrile copolymer (Tyril #798A produced by Asahi-Dow Limited) as a styrene resin according to the present invention, similar processes as those used in the preferred embodiment No. 1 were repeated, and peeling strength was measured at 135°±0.5° C. by using the same iron sheet as that used in the preferred embodiment No. 4, the results of which are summarized in Table 6. The specimen Nos. 1 through 5 represent comparative examples.

TABLE 6

| Specimen No. | Additives | Contents (%) | Peeling strength (kg) |
|---|---|---|---|
| 1 | Nothing | — | 38.4 |
| 2 | Stearic acid | 0.20 | 11.3 |
| 3 | Behenic acid | 0.20 | 11.1 |
| 4 | Calcium stearate | 0.20 | 15.7 |
| 5 | Zinc stearate | 0.20 | 16.1 |
| 6 | Behenic acid | 0.05 | 5.9 |
|  | Calcium stearate | 0.15 |  |
| 7 | Behenic acid | 0.05 | 5.6 |
|  | Zinc stearate | 0.15 |  |
| 8 | Stearic acid | 0.05 | 4.9 |
|  | Calcium stearate | 0.15 |  |
| 9 | Stearic acid | 0.20 | 4.1 |
|  | Calcium stearate | 0.12 |  |
| 10 | Stearic acid | 0.15 | 6.0 |

TABLE 6-continued

| Specimen No. | Additives | Contents (%) | Peeling strength (kg) |
|---|---|---|---|
| 11 | Calcium stearate | 0.05 | |
| | Stearic acid | 0.10 | 4.2 |
| | Calcium stearate | 0.20 | |
| 12 | Behenic acid | 0.07 | 7.0 |
| | Magnesium stearate | 0.18 | |

PREFERRED EMBODIMENT NO. 6

To 100 parts of HI polystyrene resin containing 4% by weight of polybutadiene, stearic acid, calcium stearate and zinc stearate were added singly or in combination in amounts shown in Table 7, respectively. The resultant resin compositions were injection blow molded into thin-walled food packaging containers under the following molding conditions: cylinder temperature of 180° C., distributor temperature of 225° C., hot runner temperature of 220° C. and core heating oil temperature of 140° C.

To evaluate the weldline strength of the thus molded thin-walled food packaging containers, they were subjected to falling weight test and blender test in the following way, the results of which are summarized in Table 7.

In the falling weight test, the containers were set so that a falling weight missile (cylindrical missile with tare weight of 127 g, 16 mm across and 60 mm long) should impinge orthogonally onto the weldline at the top portion of each container, and the fall of the falling weight missile was increased stepwise from 5 cm at an increment of 1 cm. In this test, the fall at which a container was broken almost 50% from its weldline was taken as a measure of the weldline strength of the container.

While, in the blender test, a blender of stainless steel with an internal volume of 2 m³ was charged with 72 thin-walled containers and rotated at 15 rpm. The number of containers which were broken at their weldlines were counted every five minutes to evaluate the weldline strength of the containers molded from the respective resin compositions.

Also, discoloration of the respective resin compositions was observed after 4 hours of retention in the injection blow molding machine under the aforementioned conditions, the results of which are summarized in Table 7.

breaking bending deflection at weldlines occurring therein were measured, the results of which are also given in Table 8.

In this experiment, injection molding conditions comprised a cylinder temperature of 200° C., mold temperature of 50° C., injection pressure of 88 Kg/cm². The flat resin plates were sized in 150 mm × 150 mm × 3 mm and had a weldline at their centers along a direction normal to a straight line connecting two opposite gates which were used to inject the resin compositions. These flat resin plates were cut perpendicularly to said weldline to prepare specimens for the aforesaid bending strength and breaking bending deflection tests.

TABLE 8

| Additives | Contents (parts) | Bending Strength (kg/cm²) | Breaking Bending Defection (mm) | Releasability |
|---|---|---|---|---|
| Stearic acid | 0.3 | 505 | 2.9 | Good |
| Stearic acid/ calcium stearate | 0.2/0.1 | 501 | 3.0 | Good |
| Stearic acid/ calcium stearate | 0.01/0.2 | 499 | 3.0 | Good |
| Calcium stearate | 0.2 | 453 | 2.6 | Good |
| Calcium stearate | 0.3 | 455 | 2.5 | Good |
| Zinc stearate | 0.3 | 420 | 2.4 | Good |

Note:
As a styrene resin, 100 parts of the same HI polystyrene resin as that used in the preferred embodiment No. 6 were used.

As fully described hereinbefore, the styrene resin composition according to the present invention has an excellent releasability and is highly effective to improve the weldline strength of the moldings molded therefrom.

Thus, it is obvious that the present invention is highly valuable from a viewpoint of its practical use, in that it provides styrene resin compositions not only having an excellent releasability but also highly effective to improve the strength of weldline portions which have so far tended to deteriorate mechanical properties of injection moldings and injection blow moldings.

What is claimed is:

1. A styrene resin composition for injection moldings and injection blow moldings with an improved weldline strength, characterized by comprising a styrene resin and additives consisting of at least one of saturated linear carboxylic acids having 12 to 22 carbon atoms (A) and at least one of metal salts of higher fatty acids (B), said additives totaling to 0.07 to 0.4 part by weight based on 100 parts by weight of said styrene resin and the weight ratio of said component (B) to said component (A) ranging from ⅓ to 3.5.

2. The styrene resin composition according to claim 1 wherein the weight ratio of said component (B) to said component (A) ranges from ½ to 2.0.

TABLE 7

| Additives | Contents (parts) | Falling Weight Test | Blender Test 10 min. | 15 min. | 20 min. | 25 min. | Discoloration After Retention | Releasability |
|---|---|---|---|---|---|---|---|---|
| Stearic acid | 0.3 | 11.5 | 20 | 70 | 89 | 100 | Yellowed | Good |
| Stearic acid/ Calcium stearate | 0.1/0.2 | 11.5 | 23 | 65 | 85 | 100 | Slightly Yellowed | Good |
| Calcium stearate | 0.3 | 10.0 | 25 | 90 | 100 | — | Slightly Yellowed | Good |

PREFERRED EMBODIMENT NO. 7

A styrene resin composition composed of 100 parts of the same HI polystyrene resin as that used in the preferred embodiment No. 6 and varied amounts of various additives shown in Table 8 were injection-molded into flat plates, respectively, and bending strength and